(No Model.)
G. LAUBE.
WHEEL FOR CHILDREN'S VEHICLES.
No. 514,858. Patented Feb. 13, 1894.
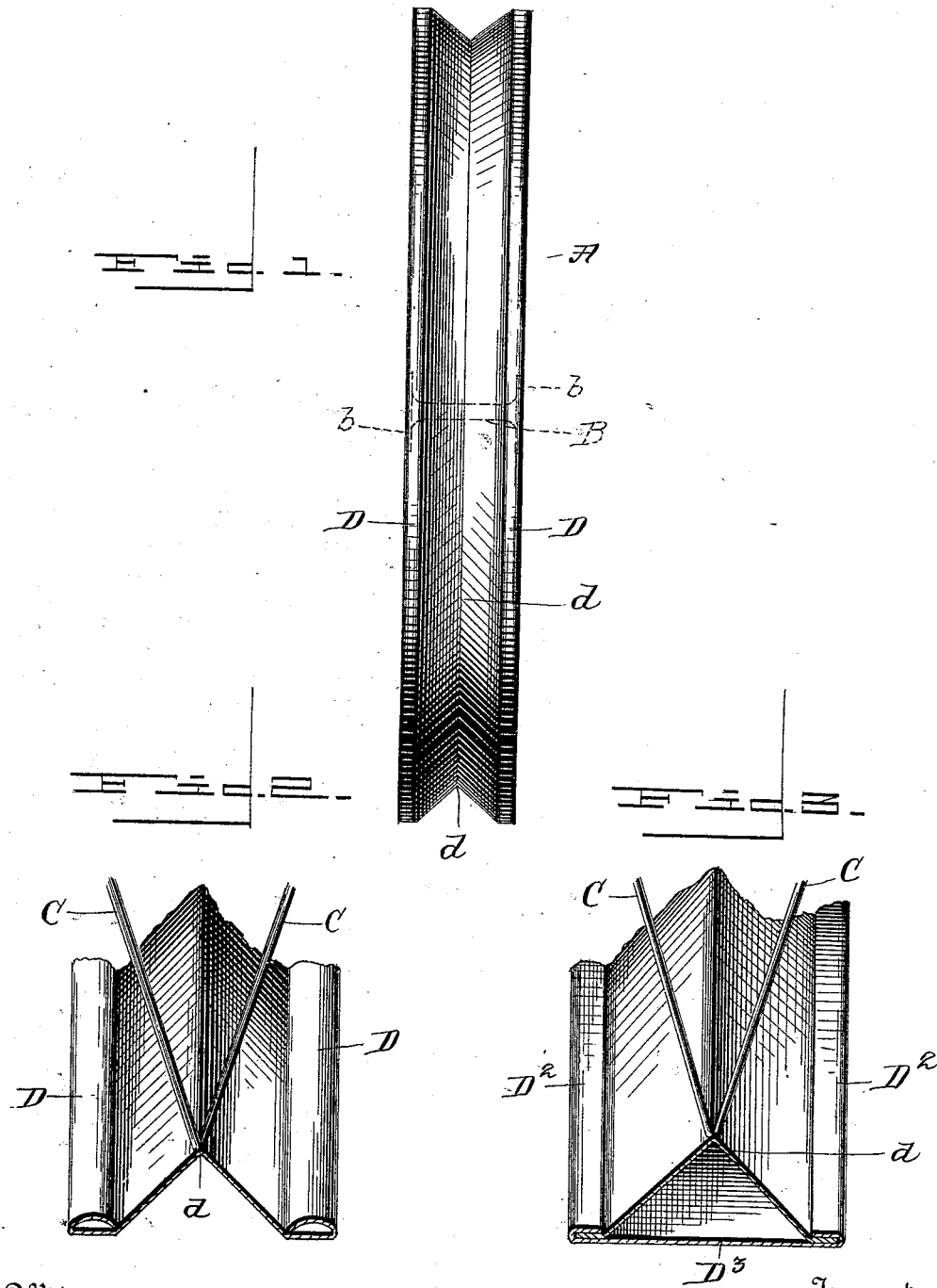

UNITED STATES PATENT OFFICE.

GODFRIED LAUBE, OF HURON, SOUTH DAKOTA, ASSIGNOR OF ONE-HALF TO JOSEPH HYMANS, OF CHICAGO, ILLINOIS.

WHEEL FOR CHILDREN'S VEHICLES.

SPECIFICATION forming part of Letters Patent No. 514,858, dated February 13, 1894.

Application filed July 3, 1893. Serial No. 479,472. (No model.)

*To all whom it may concern:*

Be it known that I, GODFRIED LAUBE, a citizen of the United States of America, residing at Huron, in the county of Beadle and State of South Dakota, have invented certain new and useful Improvements in Wheels for Children's Vehicles, of which the following is a specification, reference being had to the accompanying drawings.

This invention relates to certain new and useful improvements in the construction of wheels for bicycles, children's carriages, wagons, &c., and particularly to "fellies" for the same. With wheels of this class as heretofore constructed, great inconvenience and annoyance is experienced which is mainly due to the comparative lack of breadth in cross section of the fellies. These wheels will readily enter and drop into the grooves of flanged rails, cable slots, openings between the strips of a board walk, &c., which not only tends to wrench and strain the vehicle but often throws and thereby injures the occupant.

It is the object of the invention to obviate these objections by the provision of a simple, and at the same time, inexpensive form of wheel having double fellies which are separated one from the other and suitably supported from a central hub.

With these and other objects in view, the invention comprises various novel details of construction, combinations and arrangements of parts, which will be hereinafter more fully set forth and specifically pointed out in the claim.

In describing the invention in detail, reference is had to the accompanying drawings, forming part of this specification, wherein like letters indicate corresponding parts in the several views, in which—

Figure 1 is a view in elevation of a wheel, showing one form of felly, therein constructed and arranged to embody my improvements. Fig. 2. is an enlarged detail transverse sectional view. Fig. 3. is a similar view, showing a slightly modified form.

In the drawings, A, denotes a convenient form of metallic wheel which is here employed for purposes of illustration only, the general construction thereof being similar to the ordinary bicycle wheel, in that the hub B, is tubular and provided with terminal annular flanges $b$, to which the spokes C, are suitably secured. These spokes are arranged in pairs with the outer ends meeting or united at and connected with the apex of the centrally struck up portion $d$ of the tire. This portion $d$ also serves to connect the double fellies D, which latter are formed by bending up the marginal flanges thereof.

Fig. 3 illustrates a modification of the felly which is of an approximate tri-angular cross section with the base of the angle turned outward and the apex connected with the spokes as above described. With this form a flat circular band $D^3$, is employed and serves as a bridge-piece to connect one felly to the other. This band is arranged so as to completely inclose the tread portion of the tire, shown in Figs. 1 and 2, and may be secured in position by bending or folding the edges over the fellies $D^2$.

It will be understood that I do not confine myself to the forms herein shown and described as various changes may be made in the detail construction within the meaning of the invention.

Having fully described my invention, what I claim as new, and desire to secure by Letters Patent, is—

A tire for wheels, consisting of a single piece of sheet metal struck up centrally to form longitudinally thereof a groove, with the marginal flanges of the piece folded upon themselves, as specified.

In testimony whereof I affix my signature in presence of two witnesses.

GODFRIED LAUBE.

Witnesses:
HATTIE ROSE LAUBE,
ANNIE T. LAUBE.